United States Patent
Rauner

(10) Patent No.: US 8,726,887 B2
(45) Date of Patent: May 20, 2014

(54) METHOD FOR OPERATING A HYBRID VEHICLE

(75) Inventor: Thomas Rauner, Blaubeuren (DE)

(73) Assignee: Dr. Ing h.c. F. Porsche Aktiengesellschaft (DE)

( * ) Notice: Subject to any disclaimer, the term of this patent is extended or adjusted under 35 U.S.C. 154(b) by 196 days.

(21) Appl. No.: 13/242,614

(22) Filed: Sep. 23, 2011

(65) Prior Publication Data

US 2012/0095631 A1 Apr. 19, 2012

(30) Foreign Application Priority Data

Oct. 13, 2010 (DE) .......................... 10 2010 038 147

(51) Int. Cl.
*F02M 37/00* (2006.01)

(52) U.S. Cl.
USPC ........... 123/516; 123/518; 123/519; 123/520; 180/65.21; 180/65.23

(58) Field of Classification Search
None
See application file for complete search history.

(56) References Cited

U.S. PATENT DOCUMENTS

| | | | | |
|---|---|---|---|---|
| 4,658,797 A | * | 4/1987 | Brand | 123/520 |
| 5,143,041 A | * | 9/1992 | Franzke | 123/520 |
| 5,386,811 A | * | 2/1995 | Rochette | 123/519 |
| 5,474,047 A | * | 12/1995 | Cochard et al. | 123/491 |
| 5,499,613 A | * | 3/1996 | Bayerle et al. | 123/520 |
| 5,771,859 A | * | 6/1998 | Schlagmueller et al. | 123/339.11 |
| 6,557,534 B2 | * | 5/2003 | Robichaux et al. | 123/520 |
| 6,679,214 B2 | * | 1/2004 | Kobayashi et al. | 123/179.4 |
| 7,866,424 B2 | * | 1/2011 | Sauvlet et al. | 180/65.21 |
| 8,191,536 B2 | * | 6/2012 | Devries et al. | 123/520 |
| 2010/0313763 A1 | * | 12/2010 | Lang et al. | 96/126 |
| 2011/0100210 A1 | * | 5/2011 | Streib et al. | 95/11 |
| 2012/0116652 A1 | * | 5/2012 | Menke | 701/103 |
| 2012/0316718 A1 | * | 12/2012 | Baumann et al. | 701/22 |

FOREIGN PATENT DOCUMENTS

| | | |
|---|---|---|
| DE | 19944388 | 3/2001 |
| DE | 2354722 | 4/2001 |
| DE | 10 2007 002 188 | 7/2008 |

* cited by examiner

*Primary Examiner* — Thomas Tarcza
*Assistant Examiner* — Richard Goldman
(74) *Attorney, Agent, or Firm* — Gerald E. Hespos; Michael J. Porco; Matthew T. Hespos

(57) ABSTRACT

A method is provided for operating a hybrid vehicle (1) having an internal combustion engine (2) and an electric machine (4) that can be used individually or jointly to drive at least one axle (9, 10) of the hybrid vehicle (1) by connecting a clutch (15), and having a regeneratable filter device that takes up fuel vapors from a fuel tank of the internal combustion engine (2). To improve the comfort in a purely electric driving mode and/or to improve the reproducible operation of a hybrid vehicle during a special exhaust gas test, in a purely electric driving mode in which the hybrid vehicle (1) is driven only by the electric machine (4), the internal combustion engine (2) is switched on with the clutch (15) open to regenerate the filter device.

11 Claims, 2 Drawing Sheets

METHOD FOR OPERATING A HYBRID VEHICLE

CROSS-REFERENCE TO RELATED APPLICATION

This application claims priority under 35 USC 119 to German Patent Application No. 10 2010 038 147.0, filed on Oct. 13, 2010, the entire disclosure of which is incorporated herein by reference.

BACKGROUND OF THE INVENTION

Field of the Invention

The invention relates to a method for operating a hybrid vehicle with an internal combustion engine and an electric machine that can be used individually or jointly to drive the vehicle. The vehicle has a regeneratable filter that takes up fuel vapors from a fuel tank of the internal combustion engine.

German laid-open patent application DE 10 2007 002 188 A1 discloses a hybrid vehicle with an electric motor and an internal combustion engine that does not run continuously, but is switched off when drive is provided purely by the electric motor. Hydrocarbons that are scavenged from a filter device into an intake section cannot be combusted in the switched-off state. A control device of the known hybrid vehicle activates the internal combustion engine during electric operation of the hybrid vehicle as a function of a charge state of the filter device. As a result the hydrocarbons that are scavenged into the intake section can be fed from the filter material to combustion.

An object of the invention is to improve the comfort in a purely electric driving mode and/or to improve the reproducible operation of a hybrid vehicle in the case of a specific exhaust gas test.

SUMMARY OF THE INVENTION

The invention relates to a method for operating a hybrid vehicle having an internal combustion engine and an electric machine that can be used individually or jointly to drive at least one axle of the hybrid vehicle by connecting a clutch. The vehicle has a regeneratable filter device that takes up fuel vapors from a fuel tank of the internal combustion engine. The internal combustion engine is switched on with the clutch open to regenerate the filter device in a purely electric driving mode in which the hybrid vehicle is driven only by the electric machine. The internal combustion engine is disconnected or decoupled from the electric machine in terms of drive when the clutch is open and can be operated autonomously.

The internal combustion engine preferably is switched on in the purely electric driving mode only for regenerating the filter device and in this context does not contribute to driving the hybrid vehicle and/or to charging a battery of the hybrid vehicle.

The fuel tank can be a pressurized tank.

The hybrid vehicle preferably is a parallel hybrid vehicle and can be a plug-in vehicle. In this regard, a motor vehicle with hybrid drive whose battery can be charged externally by a power supply network is referred to as a plug-in vehicle or plug-in hybrid. The internal combustion engine of the plug-in hybrid vehicle can be a range extender.

The method of the invention can prevent an undesired occurrence of fuel smells in the purely electric driving mode of the hybrid vehicle. Furthermore, the execution of a special exhaust gas test can be simplified by switching on the internal combustion engine with the clutch open. The filter device preferably is an activated carbon filter that can store fuel vapors. Fuel vapors stored in the activated carbon filter are fed to combustion when the internal combustion engine is running, thereby regenerating the accumulator. The storage capability can be tested in what is referred to as a shed test. The regeneration capability of the filter device can be carried out in a test cycle with the brief designation FTP 75. The storage capability and/or the regeneration capability of the filter device can be tested easily in a reproducible fashion by switching on the internal combustion engine with the clutch open. A clutch is to be understood here as any other type of disconnecting element.

The internal combustion engine preferably is switched on in a time-dependent fashion with the clutch open. The duration is dimensioned so that the filter device can be regenerated sufficiently with the internal combustion engine switched on and the clutch open.

The internal combustion engine may be switched on as a function of a charge state of the filter device with the clutch open. The charge state of the filter device can be detected, for example, using a sensor device, such as a hydrocarbon sensor. The charge state of the filter device alternatively or additionally can be detected using a thermocouple element. The thermocouple element can be used, for example, to detect the temperature of a catalytic converter.

Factors that affect the vaporization of fuel may be monitored during the operation of the vehicle and may be used to switch on the internal combustion engine with the clutch open before the filter device overflows or breaks down. The monitoring may be carried out, for example, using a sensor device that is connected to a control device. The internal combustion engine can be switched on as required by means of the control device with the clutched open.

The internal combustion engine may be operated in the idling mode with the clutch open. However, the internal combustion engine does not have to be operated in the idling mode. A certain load can also be set. However, the internal combustion engine is not used to propel the hybrid vehicle at these times.

Measures for regenerating and/or scavenging the filter device are carried out with the clutch open and the internal combustion engine switched on. The method according to the invention functions with or without additional scavenging measures.

Measures for heating a catalytic converter device also may be implemented with the clutch open and the internal combustion engine switched on to improve the efficiency of the catalytic converter device.

The filter device preferably has an activated carbon filter that is scavenged with the clutch open and the internal combustion engine switched on. When the activated carbon filter is scavenged, the vapors stored in the activated carbon filter when the internal combustion engine is running are fed to combustion to regenerate the filter device.

Further advantages, features and details of the invention result from the following description in which various exemplary embodiments are described in detail with reference to the drawings.

DETAILED DESCRIPTION OF THE PREFERRED EMBODIMENTS

Figure 1:
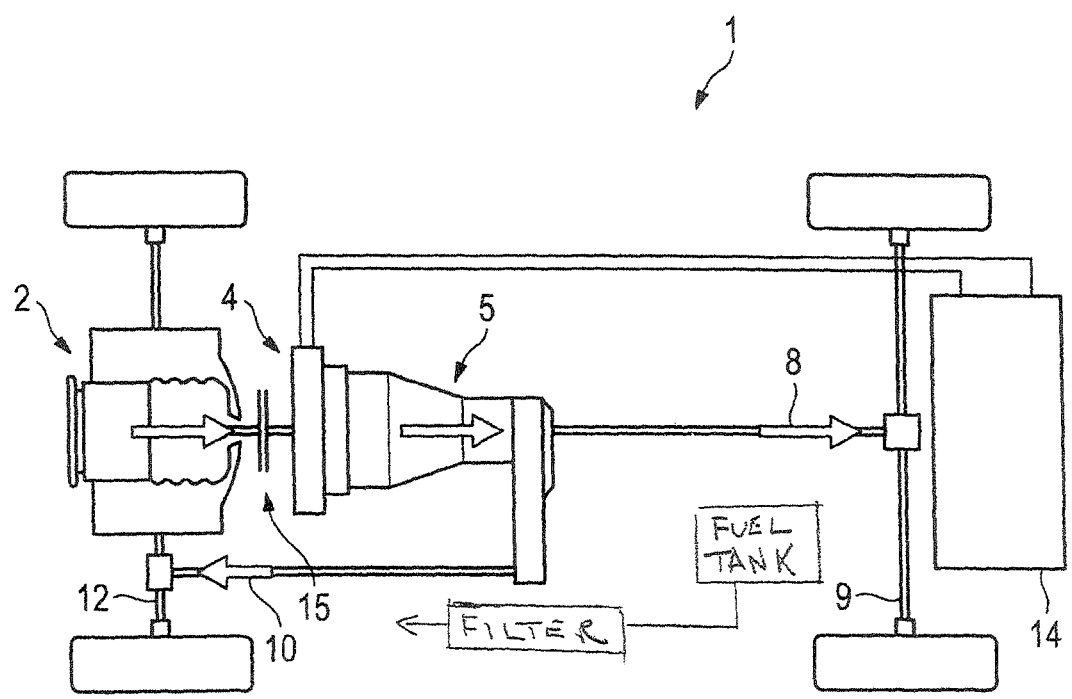
FIG. 1 is a simplified illustration of a hybrid vehicle.

FIG. 1 illustrates in a highly simplified form a hybrid vehicle 1 with an internal combustion engine 2 and an electric machine 4. The hybrid vehicle 1 is a parallel hybrid vehicle in which the internal combustion engine 2 and the electric machine 4 are arranged on an input shaft of a transmission 5. In this context, the internal combustion engine 2 or the electric machine 4 can drive the hybrid vehicle 1 either individually or jointly.

A clutch 15 is provided between the internal combustion engine 2 and the electric machine 4. Only the electric machine 4 is connected to the input shaft of the transmission 5 to drive the hybrid vehicle 1 if the clutch 15 is open. The internal combustion engine 2 is connected to the input shaft of the transmission 5 to drive the hybrid vehicle 1 either alone or together with the electric machine 4 if the clutch 15 is closed.

An arrow 8 indicates that the internal combustion engine 2 and/or the electric machine 4 can be used to drive a front axle 9. A further arrow 10 indicates that the internal combustion engine 2 and/or the electric machine 4 alternatively or additionally can be used to drive a rear axle 12 of the hybrid vehicle 1.

The electric machine 4 is supplied with electrical energy from an electric energy accumulator 14, such as a high-voltage battery. The internal combustion engine 2 is supplied with fuel from a fuel tank. The fuel vapors that occur in the fuel tank are captured by a filter device that is assigned to the fuel tank and includes an activated carbon filter. The filter device can capture only a specific quantity of fuel vapors.

The filter device must be scavenged regularly for regeneration to prevent the filter device, in particular the activated carbon filter, from breaking down and fuel vapors escaping into the surroundings. For this purpose, the internal combustion engine 2 is started to generate a partial vacuum so that the stored fuel vapors are sucked out of the filter device into the internal combustion engine 2 where they are burned.

A special operating method is provided for the hybrid vehicle 1 for purely electric travel during which the hybrid vehicle 1 is driven exclusively by the electric machine 4. More particularly, the clutch 15 is open and the internal combustion engine 2 is stationary, that is to say is not switched on.

However, fuel vapors from the fuel tank are captured with the filter device even with the internal combustion engine 2 switched off. According to the invention, therefore, the internal combustion engine 2 is activated at certain times, but in this context the clutch between the electric machine 4 and the internal combustion engine 2 remains open. The internal combustion engine 2 therefore is switched on merely to scavenge the filter device. The internal combustion engine 2 does not make any contribution to driving the hybrid vehicle 1 during this scavenging mode.

The activation of the internal combustion engine 2 is controlled using a control device, for example as a function of the charging of the activated carbon filter with fuel vapors as detected by a sensor. The activation of the internal combustion engine 2 also can be controlled as a function of the temperature of a catalytic converter in the exhaust gas system of the internal combustion engine 2. Alternatively or additionally, the activation of the internal combustion engine 2 can be controlled in a time-dependent fashion.

Figure 2:
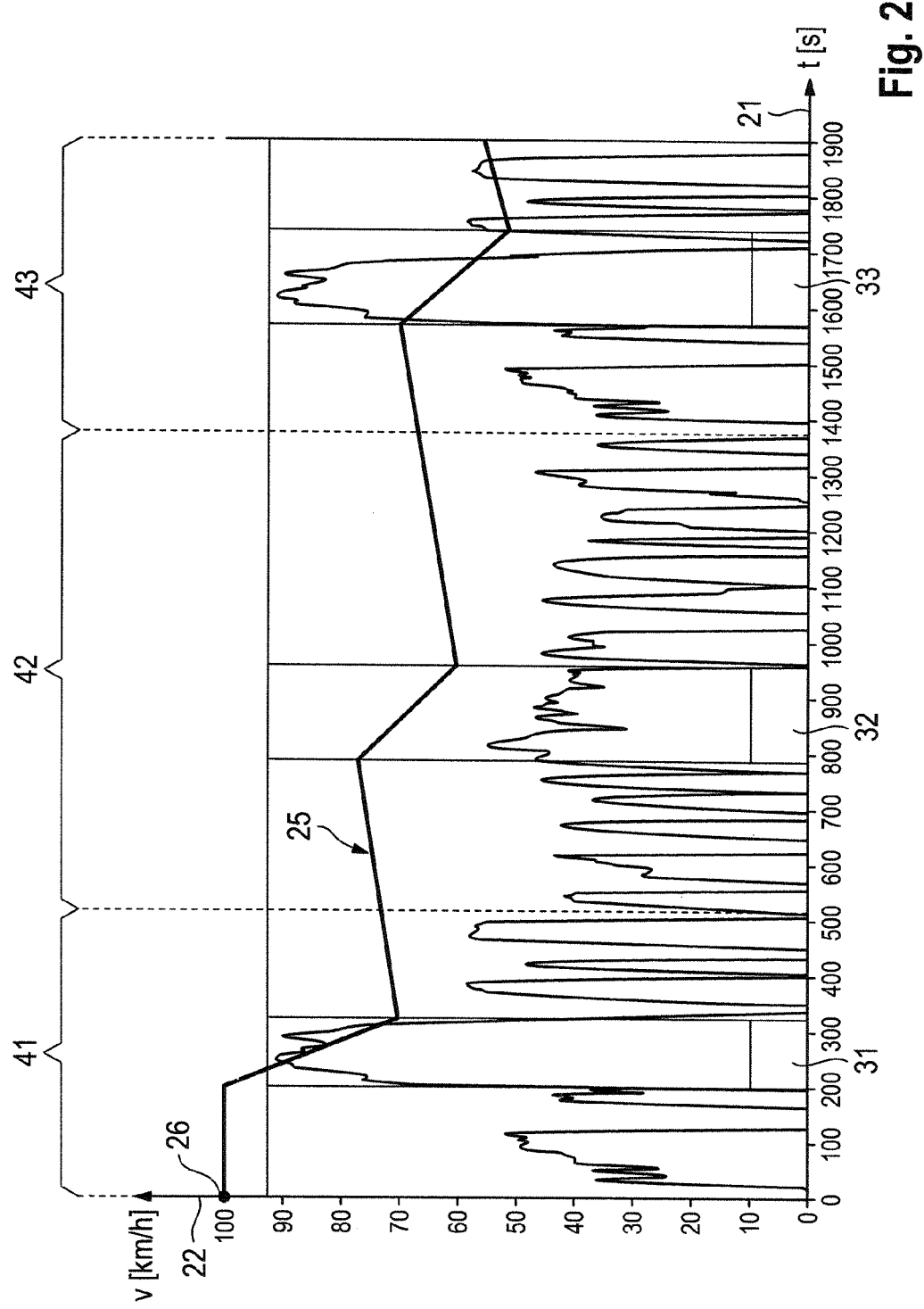
FIG. 2 is a Cartesian coordinate diagram illustrating the method of the invention.

FIG. 2 illustrates, in a Cartesian coordinate diagram with an x-axis 21 and a y-axis 22, the charge state 25 of a filter device as described above, with an activated carbon filter in a test cycle starting from a starting point 26. The time is plotted in seconds on the x-axis 21. The speed of the hybrid vehicle 1 is plotted in kilometers per hour on the y-axis 22.

The hybrid vehicle 1 is pre-conditioned in the test cycle illustrated in FIG. 2 in such a way that the charge state of the battery 14 is at a maximum, the activated carbon filter of the filter device is filled to a maximum at the starting point 26, and the fuel tank of the hybrid vehicle 1 is filled to 40 percent of its rated volume.

The maximum charged state of the battery 14 means that purely electric operation of the hybrid vehicle 1 is possible. The maximum charged state of the activated carbon filter of the filter device indicates that the internal combustion engine 2 has to be started.

As can be seen in FIG. 2, the hybrid vehicle 1 initially is driven in a purely electric manner until the first time that a speed of 45 kilometers per hour is exceeded. The internal combustion engine 2 then is switched on in a time segment 31. In this context, additional heating measures for heating the catalytic converter are implemented and the activated carbon filter is scavenged.

The internal combustion engine 2 is operated in the idling mode with the clutch 15 open. These measures are repeated, as indicated in time segments 32 and 33, whenever the charge state 25 becomes critical, that is to say a permissible charge limit is exceeded.

The exhaust gases generated by the internal combustion engine 2 when the test cycle is being carried out are captured in three different bags in three time segments 41, 42, 43. The associated test cycle therefore also is referred to as a three-bag test. An interval of ten minutes is inserted between the two time segments 42 and 43.

What is claimed is:

1. A method for operating a hybrid vehicle having an internal combustion engine and an electric machine that can be used individually or jointly to drive at least one axle of the hybrid vehicle by connecting a clutch, the hybrid vehicle having a filter device that captures fuel vapors from a fuel tank of the internal combustion engine and that is capable of renewal through purging, the method comprising: driving the hybrid vehicle only by the electric machine in a purely electric driving mode, and switching the internal combustion engine on with the clutch disengaged to regenerate the filter device during preset operating conditions.

2. The method of claim 1, wherein the step of switching on the internal combustion engine is carried out in a time-dependent fashion with the clutch disengaged.

3. The method of claim 1, wherein the step of switching on the internal combustion engine is carried out as a function of a charge state of the filter device with the clutch disengaged.

4. The method as of claim 1, further comprising monitoring factors that are indicative of a state of charge of the fuel filter device during operation of the vehicle and wherein the step of switching on the internal combustion engine is carried out before the filter device overflows or breaks down as determined by the monitored factors.

5. The method of claim 1, wherein the step of switching on the internal combustion engine comprises operating the internal combustion engine in an idling mode with the clutch open.

6. The method of claim 1, further comprising carrying out measures for regenerating or scavenging the filter device with the clutch disengaged and the internal combustion engine switched on.

7. The method of claim 1, further comprising implementing measures for heating a catalytic converter device while performing the step of switching on the internal combustion engine with the clutch disengaged.

8. The method of claim 1, wherein the filter device has an activated carbon filter and wherein the method further comprises regenerating or scavenging the filter device with the clutch disengaged and the internal combustion engine switched on.

9. A method for operating a hybrid vehicle having an internal combustion engine, an electric machine and a clutch between the internal combustion engine and the electric machine so that the internal combustion engine and the electric machine can be used individually or jointly to drive at least one axle of the hybrid vehicle by connecting a clutch, the hybrid vehicle having a filter device that captures fuel vapors from a fuel tank associated with the internal combustion engine and that is capable of renewal through purging, the method comprising:

driving the hybrid vehicle only by the electric machine in a purely electric driving mode with the clutch disengaged;

monitoring factors that are indicative of a state of charge of the fuel filter device during operation of the vehicle;

switching on the internal combustion engine while keeping the clutch disengaged for regenerating the filter device during preset operating conditions; and switching off the internal combustion engine after a sufficient operation to regenerate the filter device while keeping the clutch disengaged, thereby returning to purely electric driving mode with the clutch disengaged.

10. The method of claim 9, wherein the step of switching on the internal combustion engine, comprises operating the internal combustion engine in an idling mode with the clutch disengaged.

11. The method of claim 10, further comprising implementing measures for heating a catalytic converter device while performing the step of switching on the internal combustion engine with the clutch disengaged.

\* \* \* \* \*